United States Patent
Cunningham et al.

(10) Patent No.: US 9,256,510 B2
(45) Date of Patent: Feb. 9, 2016

(54) AUTOMATIC RULES BASED CAPTURING OF GRAPHICAL OBJECTS FOR SPECIFIED APPLICATIONS

(75) Inventors: Ger Cunningham, Dublin (IE); Elaine Hanley, Dublin (IE); Ronan O'Suilleabhain, Dublin (IE); Fred Raguillat, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 13/156,540

(22) Filed: Jun. 9, 2011

(65) Prior Publication Data

US 2012/0317549 A1    Dec. 13, 2012

(51) Int. Cl.
G06F 9/44       (2006.01)
G06F 11/36      (2006.01)
G06F 11/30      (2006.01)

(52) U.S. Cl.
CPC .......... *G06F 11/3612* (2013.01); *G06F 11/302* (2013.01); *G06F 11/3055* (2013.01)

(58) Field of Classification Search
CPC   G06F 11/302; G06F 11/3055; G06F 11/3612
USPC ......................................... 717/124–125, 135
See application file for complete search history.

(56) References Cited

U.S. PATENT DOCUMENTS

| | | |
|---|---|---|
| 5,349,662 A | 9/1994 | Johnson et al. |
| 5,678,002 A | 10/1997 | Fawcett et al. |
| 5,889,518 A | 3/1999 | Poreh et al. |
| 6,222,542 B1* | 4/2001 | Poreh et al. ............... 715/804 |
| 6,574,644 B2 | 6/2003 | Hsu et al. |
| 7,219,138 B2 | 5/2007 | Straut et al. |
| 7,584,161 B2 | 9/2009 | Forbes et al. |
| 7,680,809 B2 | 3/2010 | Deng et al. |
| 7,707,143 B2 | 4/2010 | Bruce et al. |
| 7,849,049 B2 | 12/2010 | Langseth et al. |
| 2004/0217987 A1 | 11/2004 | Aran |
| 2004/0268212 A1* | 12/2004 | Malik ........................ 715/500 |
| 2007/0261035 A1* | 11/2007 | Duneau ...................... 717/135 |
| 2009/0172703 A1 | 7/2009 | Nakano et al. |
| 2010/0088683 A1* | 4/2010 | Golender et al. ........... 717/128 |
| 2010/0115417 A1 | 5/2010 | Cox et al. |
| 2011/0314343 A1* | 12/2011 | Hoke et al. ................. 714/45 |
| 2012/0173997 A1* | 7/2012 | Schwerdtfeger et al. ..... 715/762 |

OTHER PUBLICATIONS http://dev.eclipse.org/viewcvs/viewvc.cgi/org.eclipse.swt.snippets/src/org/eclipse/swt/sni, pp. 1-2, 2004.

Olsson et al., "User Needs and Design Guidelines for Mobile Services for Sharing Digital Life Memories," pp. 273-282, Sep. 2-5, 2008.

(Continued)

*Primary Examiner* — Duy Khuong Nguyen

(74) *Attorney, Agent, or Firm* — Susan Murray; SVL IPLaw Edell, Shapiro & Finnan, LLC

(57) ABSTRACT

Graphical objects presented by a computer system are captured by monitoring execution of an application on the computer system, and capturing one or more graphical objects of a graphical user image presented by the computer system and associated with the application. The one or more graphical objects are captured automatically in accordance with a predefined set of rules for the application.

12 Claims, 7 Drawing Sheets

(56) References Cited

OTHER PUBLICATIONS http://www.techsmith.com/camtasia, Screen Recording & Video Editing Software downloaded Mar. 8, 2011, (2 pages).

http://www.timesnapper.com, The Automatic Screenshot Journal, downloaded Mar. 8, 2011, (2 pages).

SEA, Software Engineering of America; "Capture"; Jan. 2010, (2 pages).

Raz-Lee Capture The Series Security Experts, iSecurity Peace of Mind for Management, Jan. 2010, (2 pages).

* cited by examiner

AUTOMATIC RULES BASED CAPTURING OF GRAPHICAL OBJECTS FOR SPECIFIED APPLICATIONS

BACKGROUND

1. Technical Field

The present invention relates to capturing images of a graphical user interface (GUI) for an application based upon a pre-defined set of rules (e.g., rules that include Boolean logic) during operation of the application.

2. Discussion of the Related Art

Supporting software applications in the field is time-consuming and costly. Many software applications provide inadequate or no logging facilities to address potential issues during use of the applications. Supporting customers that use these applications can be greatly enhanced when graphical image captures (e.g., screen shots) of portions of the applications showing user activity leading up to a bug is available to a support engineer, particularly for applications that are mainly graphical in nature. Manually captured graphical images provided by customers in such a scenario are often unsatisfactory, often due to a vital step not having been captured by the customer to tell the complete story relating to the processing steps in the application leading up to the bug.

Applications exist that allow remote logging into a user's machine to monitor application use (e.g., to capture activities leading up to a bug in an application). However, this is not always feasible, due to a number of issues (e.g., different time zones and security concerns for customers). Applications also exist that capture screen shots during use of applications at fixed time intervals. However, such applications are also problematic since they typically require significant amounts of memory to save the captured information in order to ensure user activity is not missed. Such applications are therefore less suitable to transmission over a network (e.g., via the Internet).

BRIEF SUMMARY

Accordingly, embodiments of the present invention include a method, a computer program product and a system are provided for capturing graphical objects presented by a computer system, comprising monitoring execution of an application on the computer system, and capturing one or more graphical objects of a graphical user image presented by the computer system and associated with the application. The one or more graphical objects are captured automatically in accordance with a pre-defined set of rules for the application.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
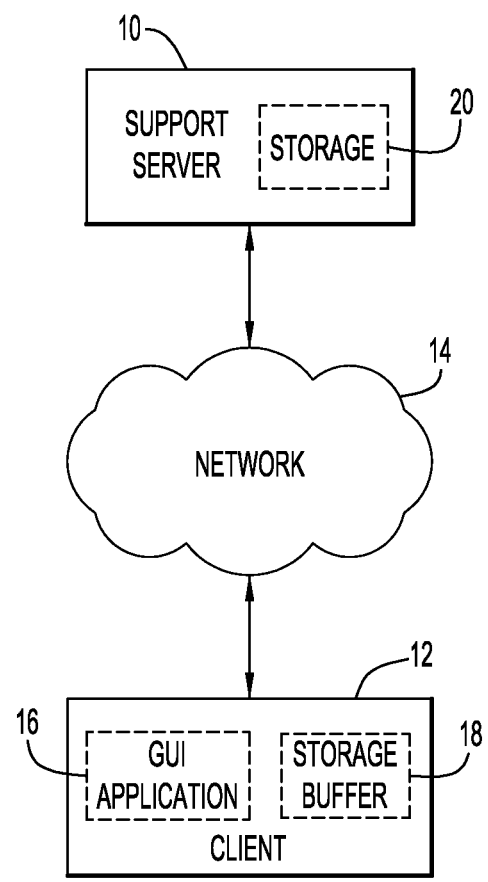
FIG. 1 is a diagrammatic illustration of an example computing environment for use with an embodiment of the present invention.

In accordance with embodiments of the present invention, a method, system and computer program product facilitate the capturing of graphical objects presented by a computer system, where execution of an application on the computer system is monitored, and one or more graphical objects of a graphical user image presented by the computer system and associated with the application are captured. The one or more graphical objects are captured automatically in accordance with a pre-defined set of rules for the application being executed by the computer system. The rules setting forth when to initiate image captures can be defined using Boolean logic. The example embodiments of the invention are particularly suitable for use in GUI applications where text logging is not available.

In particular, the embodiments of the present invention facilitate the capturing of graphical images from GUI (graphical user interface) applications based upon rules that can be tailored for a particular application and to user activities. In an example embodiment, small areas of an image of a graphical user interface (e.g., a portion instead of the entire window of the GUI) are captured for a particular application, such as capturing individual graphical objects (e.g., dialog boxes and message boxes), so as to reduce the memory and other resources required to store and transmit captured data and to further ensure that only information relevant to the target application is captured (thereby safeguarding the privacy of the user).

The embodiments of the invention are useful for a number of scenarios in which it is desirable to monitor and capture GUI events during use of an application. In an example scenario, a support group may be based in one country to support GUI based software applications being utilized on client systems located in other diverse countries separated by great distances, time zones and with different languages. In such a scenario, logging files at the client location in an attempt to report a bug or other issue with an application from the field is often inadequate. For example, an application user at the client side may capture GUI images and send to support personnel so that someone on the support side can attempt to recreate an event with the same application in order to determine what caused the event. However, obtaining graphical captures on the client side is prone to human error since the client side user may decide that capturing some steps during the event is not important (thus leaving out one or more steps that might be valuable to support personnel in determining the cause of an event), and this can lead to a significant loss of valuable time in resolving an issue. There is also overhead associated with outlining to the client the procedure they should follow to capture the displayed images. In addition, due to the time zone and language differences, it is often difficult or impractical for support personnel to directly access and monitor in real time an application being run on a client system in order to accurately record an event (e.g., to debug an issue with an application). Having an automated mechanism for capturing user actions in an application as set forth in the embodiments of the present invention eliminates these shortcomings.

An example environment for use with present invention embodiments is illustrated in FIG. 1. Specifically, the environment includes one or more support server systems 10, and one or more client or end-user systems 12. Each server system 10 and client system 12 may be remote from each other and communicate over a network 14. The network may be implemented by any number of any suitable communications media (e.g., wide area network (WAN), local area network (LAN), Internet, Intranet, etc.). Alternatively, each support server system 10 and client system 14 may be local to each other, and communicate via any appropriate local communication medium (e.g., local area network (LAN), hardwire, wireless link, Intranet, etc.).

The support server systems 10 and client systems 12 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, analysis module, browser/interface software, etc.). In particular, a client system 12 includes a GUI application 16 that is run by the client system and displays graphical images and objects (e.g., in a window display) utilizing the display or monitor of the client system during operation of the GUI application 16. The client system 12 further includes a storage buffer 18 to store data including captured GUI images during operation of the GUI application 16 in the manner described below. Alternatively, the captured GUI images can be transmitted directly (e.g., as they are captured) to the support server system 10 for saving in a storage module 20. This can be done to ensure that GUI images are successfully transferred to the support server system 10 for evaluation (e.g., to protect against scenarios in which a client system 12 may freeze up or unintentionally close or crash during operation due to a bug encountered in the GUI application).

The client system 12 can periodically communicate with a support server system 10 over the network 14 to report information (e.g., to transfer captured images stored in the storage buffer 18) associated with operation of the GUI application 16. For example, the client system is configured with suitable software to operate according to certain rules to determine when to initiate image captures associated with a particular user activity during operation of a specified GUI application. Any one or more set of rules can be utilized to determine when and under what conditions to initiate image captures during operation of a GUI application. When the application is being used by the client system 12, the rules are implemented to determine whether and when to capture an area of the displayed image (e.g., a screen shot, the entire window display, a dialog box, a menu selection, etc. displayed by the GUI application), and that portion of the image is then captured and stored in the storage buffer 18. Captures can be implemented, for example, when a bug occurs, and the stored captured images can be transmitted over the network 14 to the support server system 10 associated with the GUI application for analysis of the information.

The software utilized to apply the rules for implementing the capture scheme of GUI application images can be provided in any suitable manner for each client system 12. In an example embodiment, the software implementing the capture scheme rules is integrated as part of the GUI application 16. In another example embodiment, the capture scheme rules are incorporated within a separate software application that is run on the client system 12 and assigned to monitor the GUI application of interest. The image capturing application captures some or all of the GUI application display in accordance with when one or more capture scheme rules designate an image must be captured during operation of the GUI application. Different capture scheme rules can be provided for different GUI applications, such that each GUI application of interest would be provided with one or more sets of capture scheme rules that are tailored for that specific application. Further, the capture scheme rules associated with the particular GUI application of interest can optionally be enabled and disabled by the user of the client system 12 (e.g., via a menu selection) before or during operation of the GUI application.

In an example embodiment, capture scheme rules can be implemented utilizing known identification (ID) information for various graphical items (e.g., menu selections, error messages/dialog boxes and/or other dialog boxes, other window images, etc.) associated with a GUI application of interest. The capture scheme rules can be designed to implement a trigger which initiates capturing of images for the GUI application based upon a particular graphical item ID that is displayed by the GUI application (e.g., an error message displayed by the GUI application). In one example embodiment, a capture scheme rule can be implemented with a trigger that secures captures of graphical items leading up to and including one or more error dialog boxes, such as capturing graphical items from the GUI application in response to an Error Dialog 1 box or an Error Dialog 2 box being displayed. For example, a rule for identifying whether to capture graphical items for such a scenario is as follows:

Rule: (Dialog ID=[ID of Error Dialog 1]) OR (Dialog ID=[ID of Error Dialog 2])

If it is desirable to capture data entered within such a dialog box before the dialog box disappears from the display, the rule could be implemented as follows:

Rule: (Dialog ID=[ID of Error Dialog 1]) OR (Dialog ID=[ID of Error Dialog 2]) AND ([OK Button] OR [Cancel Button])

Capture scheme rules tailored for a specific GUI application can selectively decide which displayed graphical images to capture (e.g., based upon the ID associated with each graphical image). For example, certain dialog boxes or message boxes may not be of interest in detection of a bug for a particular GUI application. The capture scheme rules can therefore be configured to exclude from capture those graphical images displayed by the GUI application that are not considered important or necessary for analysis of an event that occurs within the GUI application.

In another example, capture scheme rules for a particular GUI application can be configured to trigger capture of displayed graphical images associated with a download feature of the application, where the trigger occurs when a failure condition is encountered during a download by the GUI application. Example trigger conditions can result from the following sequence of events:

Rule 1: Dialog ID=[ID of Download Dialog]
Rule 2: [Cancel Button] in dialog is selected The trigger to capture selected graphical images displayed by the GUI application is implemented only when both rules are satisfied in sequence. As with the other noted examples, the capture of selected graphical images for storage in the storage buffer 18 (and transfer to the storage module 20 of the support server system 10) can occur before (i.e., leading up to), during and/or after the triggering event or events.

Capture scheme rules can implement a temporary buffer, such as a circular buffer, to facilitate capture of selected graphical images displayed during operation of the GUI application (as identified by the IDs associated with such graphical items) before, during and after triggering events as defined by each capture scheme rule. The temporary buffer can be part of the storage buffer 18 or a separate storage structure in the client system 12. A circular buffer can be used as the temporary buffer, where the circular buffer has a selected memory size with new data entering the buffer queue and overwriting the oldest or earliest stored data in the circular buffer. When a triggering event occurs, as defined by any capture scheme rule associated with a GUI application, the graphical items of interest from the GUI application captured before and/or after the triggering event are stored within a permanent (i.e., not overwritten) storage location of the storage buffer 18 and/or transmitted directly to the storage module 20 of the support server system for analysis by support personnel.

Figure 2:
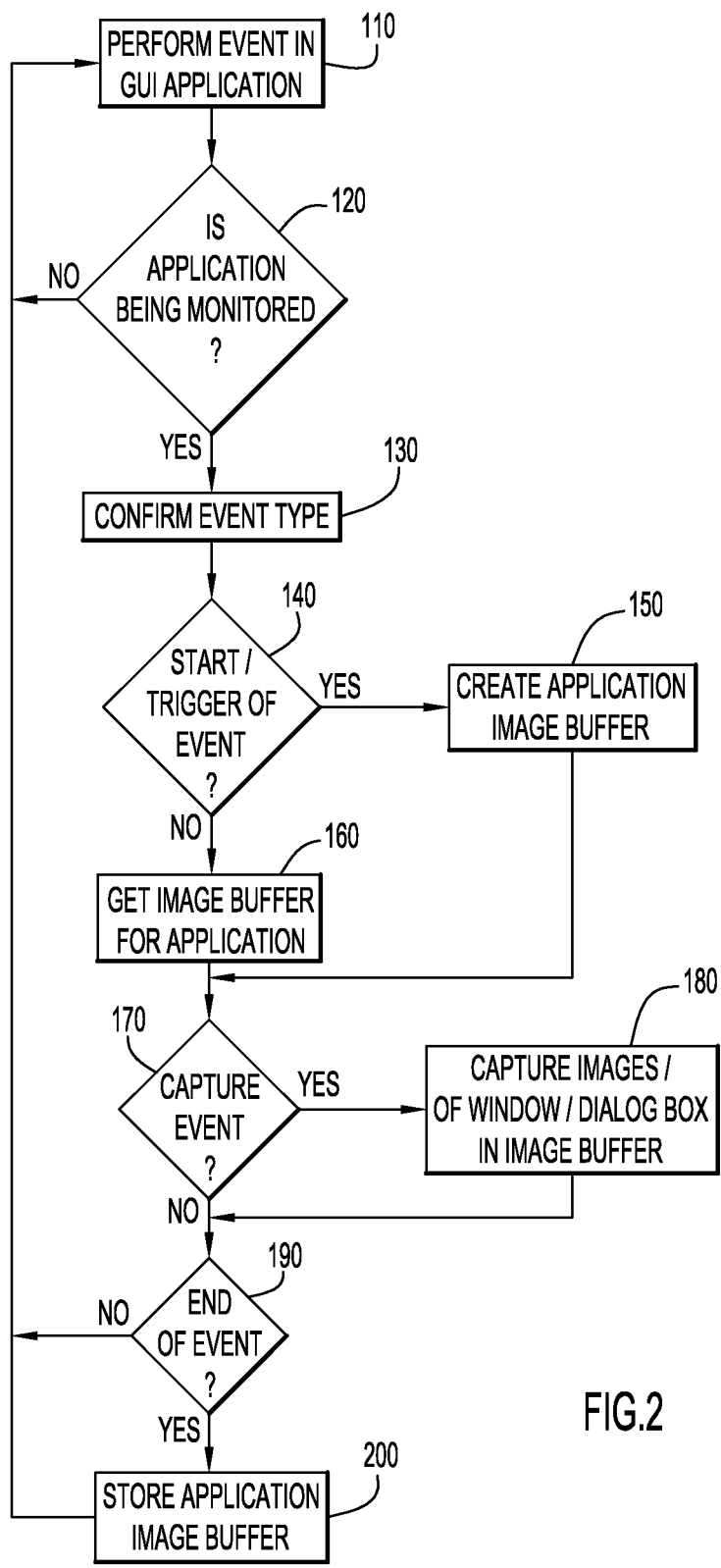
FIG. 2 provides a flowchart depicting an example method for capturing GUI objects from a specified application utilizing the example embodiment of FIG. 1 in accordance with an embodiment of the present invention.

The flowchart of FIG. 2 provides an example method for implementing a capture scheme rule for capturing selected graphical images displayed by a GUI application 16 on the display of a client system 12 as shown in FIG. 1. It is noted that, while the example method describes implementation of a single capture scheme rule, other capture scheme rules can also be implemented for the GUI application, where a plurality of capture scheme rules may be implemented separately or in combination (e.g., with dependence upon each other) during operation of the GUI application. Initially, an event occurs during operation of the GUI application (step 110). The event can be the display of a graphical image by the GUI application, such as a dialog or message box (e.g., an error message), a pull-down menu box for selection of an item or action by the user, etc. As noted above, the event is identified by the capture scheme rule by an ID associated with the graphical image for that particular GUI application. A determination is made whether the GUI application is being monitored (step 120). For example, as noted above, the GUI application may be configured to operate (e.g., based upon user selection to turn off the monitoring of the GUI application) without implementation or activation of graphical image capturing. In the event the graphical image monitoring is not active, the process returns to step 110.

In the event the GUI application is being monitored, captures of selected graphical images are being stored at least temporarily (e.g., in a circular buffer storage structure as described above). The event type is confirmed (step 130), e.g., utilizing the ID associated with the graphical image displayed by the GUI application. A determination is made regarding whether the confirmed event is the start or a trigger for storing captured graphical images (step 140). For example, the event could satisfy a rule or a portion of a rule (such as rules described above) to indicate that certain identified captured graphical images need to be stored at some point before, during and/or after display of the graphical image identified as the starter or trigger for an event (so as to ensure that adequate graphical information is captured to successfully analyze a bug or other issue associated with the event). Some examples of start or triggering events include, without limitation, a particular dialog box is shown, the GUI application is shown (e.g., for the first time), a particular software wizard for the GUI application is shown, one of a predefined set of buttons in the GUI application display is selected, a particular GUI software widget is selected; an "OK" button on a preferences setting is selected, etc.

When it is determined that there is a start or trigger for an event, the application image buffer is created (step 150) to initiate storing of selected graphical images in the storage buffer 18 of the client system 12, thus preventing overwriting or erasing of any captured images (e.g., by the circular buffer). As part of the capture scheme rules, a determination is made regarding at what point captured graphical images are to be stored in the image buffer (e.g., at a point prior to identification of the start or triggering of an event (in which graphical images are temporarily stored in a circular or other suitable buffer), at the point of identification of the start or triggering of an event, or at some point after the start or triggering of an event). When it is determined that the start or triggering of the event has already occurred, the application image buffer is retrieved (step 160).

The next step is a determination regarding whether to capture the graphical image associated with the event (step 170). As noted above, the ID associated with the displayed graphical image of the GUI application 16 can be used by a capture scheme rule to determine whether it is necessary or desirable to capture the graphical image. If the decision is made to capture the graphical image, the graphical image is captured in the image buffer (step 180). The graphical image can be simply a window or dialog box and not the entire window display of the GUI application.

A determination is made regarding whether the event has ended (step 190). For example, the capture scheme rules can be configured to designate certain graphical image IDs for the GUI application as an indication of an end of an event. Some examples of end events include, without limitation, a selection of "OK" or "Cancel" in a Dialog box, an exit of the GUI application, an error message, etc. If it is determined that the event has not finished, the process proceeds back to step 110, where the next graphical image is displayed for an event by the GUI application. If it is determined that the end of an event has in fact occurred, the selected graphical images associated with the event that are stored in the storage buffer 18 of the client system 12 (step 200). For example, in an embodiment in which a circular buffer is utilized as the application image buffer, the selected graphical images captured within the circular buffer that are associated with the event are stored in the storage buffer 18. As noted above, these stored graphical images are also transmitted, via the network 14, to the storage module 20 of the support server 10 (e.g., directly or at the same time the graphical images are stored within the storage buffer 18, or at some predetermined time after the occurrence of the event).

Figure 3:
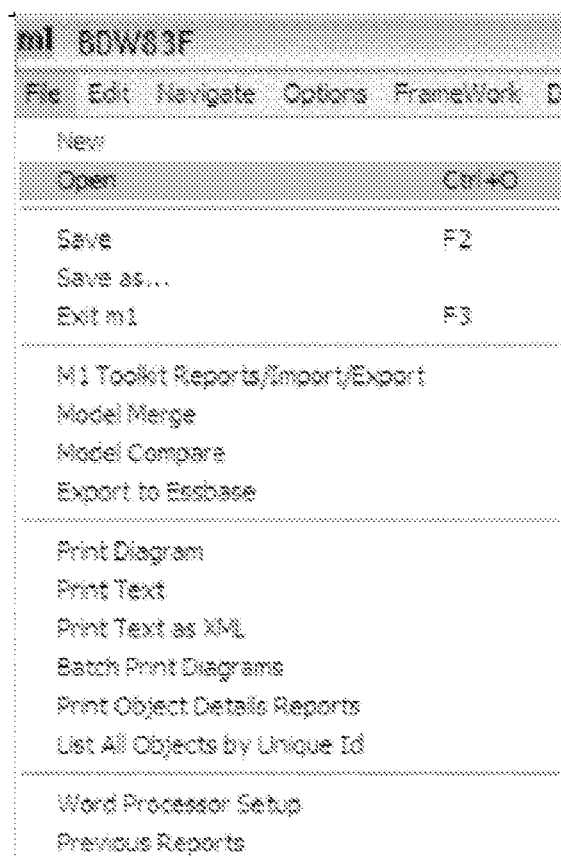
FIGS. 3-7 illustrate graphical objects that are displayed by a GUI application, some of which are captured according to capture rules implementing Boolean logic in accordance with an embodiment of the present invention.

An example embodiment implementing a capture scheme rule in a decision is made to capture an event, including the capture of one or more graphical objects, during operation of a GUI application is now described with reference to FIGS. 3-7. In particular, this example relates to a user (e.g., a user at client system 12) opening a file in a GUI application, where a sequence of actions by the user resulted in an error message (triggering an event to be captured) being displayed at the end of the sequence of actions. In FIG. 3, a graphical object is captured showing a dialog box (a pull-down menu) in which the user is selecting the Open function to open a file from a data directory. In the next action by the user in the sequence, depicted in FIG. 4, the user selects a file to open (DCT5441). While opening the file, the user also accesses the Help facility of the GUI application, which is depicted by the two actions as shown in the dialog boxes of FIGS. 5 and 6 (where the user selects information on User Access as a sub-topic under Getting Started in the Help facility of the GUI application). An error dialog box, depicted in FIG. 7, is displayed by the GUI application as the final graphical object in the sequence of actions for this event.

Figure 6:
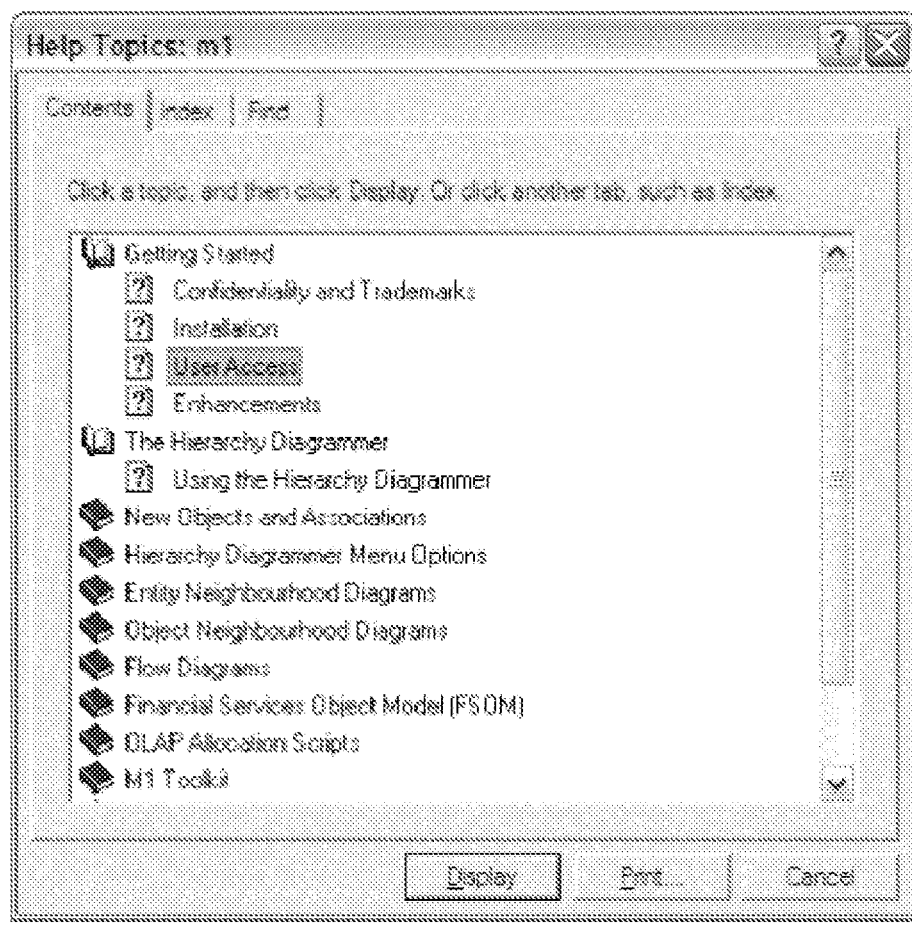
Figure 7:
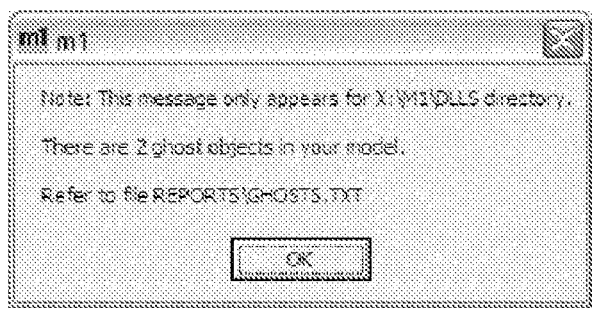

In this example embodiment, the images of interest may be only the actions that led to the display of an error message (as shown in FIG. 7), while other actions by the user resulting in displayed images by the GUI application, including the display of dialog boxes associated with the user accessing the Help facility, may not be of interest. The capture scheme rules can be designed so as to capture only the graphical images of interest, including only portions of the GUI graphical display that are of interest (e.g., capturing only dialog boxes such as those depicted in FIGS. 3-7). An example set of rules that can be implemented by a capture scheme rule associated with this GUI application is provided as follows:

Rule 1.1: Menu=File.Open

Rule 1.2: (Dialog ID=[ID of "Open an existing model"]) AND (Button Pressed=OK Button)

Rule 1.3: (Dialog ID=[ID of error message displayed in FIG. 7]) AND (Button Pressed=OK Button)

These rules can be implemented to capture graphical images using Boolean logic as set forth in the pseudo code below:

```
Rule: ErrorOpeningModelCapture(UserEvent) {
    If (UserEvent = Menu.File.Open) then {
        /* System is in 'Open Model' state, so create a new timestamped
        buffer */
        ImageBuffers.create("Error Opening Model Captures");
    }
    If (UserEvent.getSource( ) == Dialogs.OpenExistingModel) then{
        If (UserEvent == Dialogs.OpenExistingModel.Cancel) then {
            /* Latest Image Buffer (previously opened) is dumped as no
            attempt made to open models */
            ImageBuffers.dumpLatest("Error Opening Model
            Captures");
        }
        Else If (User Event === Dialogs.OpenExistingModel.OK) then {
            /* status of dialog is grabbed at point of hitting OK */
            Image <- Capture(Dialogs.OpenExistingModel);
            /* image is added to the buffer for Errors when opening a
            model */
            ImageBuffers.getLatest("Error Opening Model
            Captures").add(Image);
        }
    }
    If (UserEvent.getSource( ) == Dialogs.OpenExistingModel.Errors)
    then {
        /* A model opening error has occured */
        Image <- Capture(UserEvent.getSource( ));
        ImageBuffers.getLatest("Error Opening
        Model Captures").add(Image);
        /* Mark the current 'Error Opening Model Captures' buffer as
        being in error */
        ImageBuffers.getLatest("Error Opening Model
        Captures").markAsError( )
    }
}
```

Figure 4:
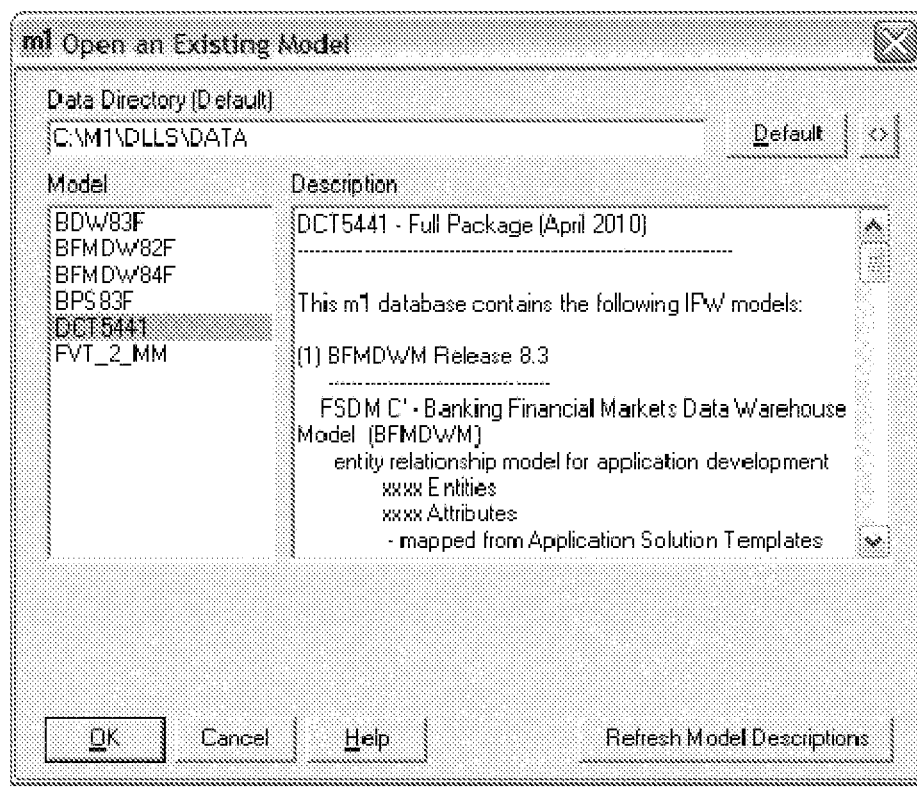
Figure 5:
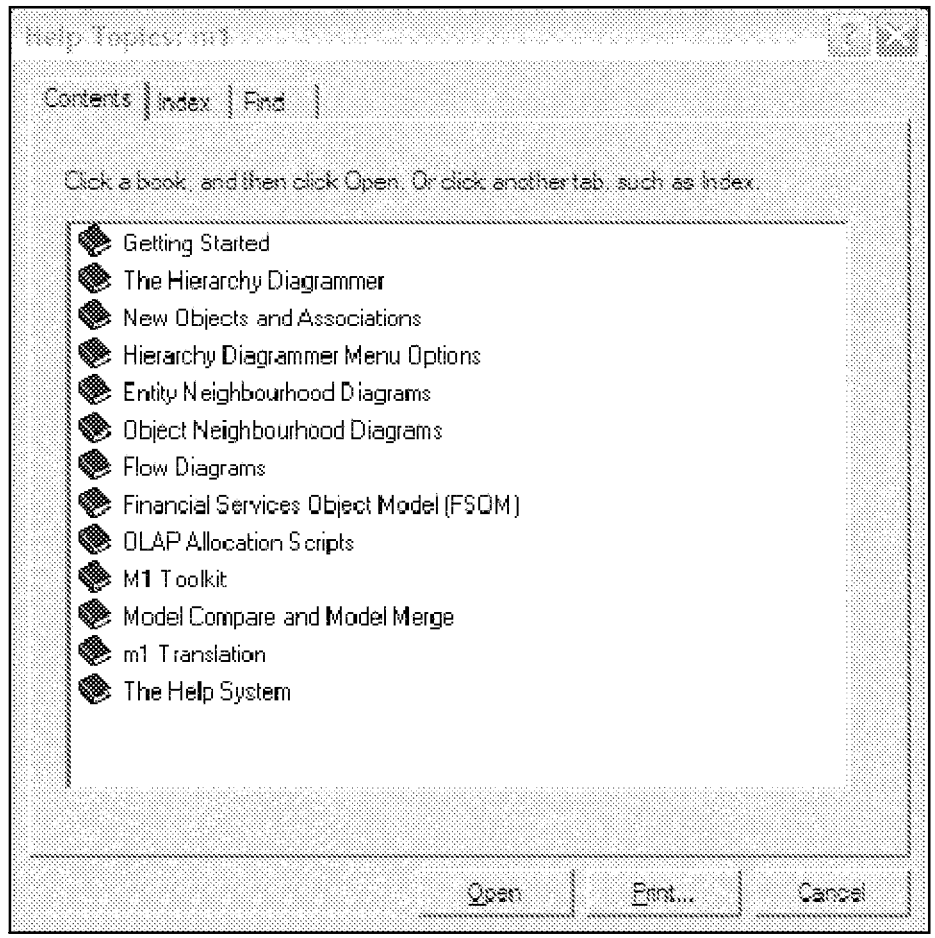

This set of capture scheme rules implementing Boolean logic will result in only the graphical objects of FIGS. 3, 4 and 7 being captured and stored (i.e., the Help dialog boxes of FIGS. 5 and 6 would not be captured for storage and eventual delivery to the support server 10). In addition, while the capture scheme rules capture certain images, the final decision to store such captured images can be implemented upon the triggering action of the event, which is the error message of FIG. 7. So, for example, graphical images such as those set forth in FIGS. 3 and 4 may be captured in accordance with the capture scheme rules as described above. However, if no triggering event occurs, such as the error message of FIG. 7, the captured images may never be stored or sent to the support server 10. As noted above, a circular buffer scheme can be employed in the embodiments to capture graphical images, such as the graphical images of FIGS. 3 and 4. If no triggering event occurs (such as the error message of FIG. 7), the graphical images may eventually be saved over with other graphical images determined to be captured in the continuing sequence of operations by the user of the GUI application.

Thus, the example embodiments described above and depicted in the figures provide a rules based schema for automatically capturing selected graphical images of a GUI application when an event is detected (e.g., the initial steps of a bug or other issue in the application). The example embodiments can determine starting and ending points of an event to be detected by identifying graphical images displayed by the GUI application and/or selections made by the user (e.g., in dialog boxes, pull down menus, etc.). Where a GUI application does not register a start and/or end graphical image that indicates the occurrence of an event to be captured, other default actions by the user and/or graphical displays by the GUI application can provide a default for starting and ending capturing points for the event (e.g., any one or more of a window opening/closing action in the GUI application, a Dialog open or Dialog close operation, a GUI software wizard next operation, etc., might be designated as a start/stop point for capturing an event).

In addition, graphical images of a GUI application can be captured even in scenarios in which part or all of the GUI application window containing the graphical image of interest is overlaid by another application window in the display of the client system 12.

The ability to capture graphical images in GUI applications, and in particular, graphical images for a GUI application that is overlaid by another application (e.g., a window of interest for capturing of graphical images is overlaid by another window displayed by the client system 12), can be achieved utilizing any known or other suitable techniques. For example, open source software is available for performing captures of graphical images in certain applications, including graphical images for an application that is overlaid by another application running on a client's system. One example is a Standard Widget Toolkit (SWT) for Java designed to provide efficient, portable access to the user-interface facilities of the operating systems on which it is implemented. SWT is available for numerous operating system platforms. One example of a commercially available SWT is Eclipse SWT API. The SWT allows for the capture of a Window widget, by capturing an SWT Image object within a Graphics Context as a bitmap file. The Graphics Context allows for the copying of a defined area within a Display context, where the Display context contains a number of open application windows. The contents of a widget's display is copied to the Image object, which can then be copied to a file (e.g., the image buffer). In addition, the bitmap file could also be converted to a conventional or any other suitable format (e.g., a JPEG format).

The graphical image capture scheme of the embodiments in the invention can be configured to only capture graphical items displayed by the GUI application of interest, while all other applications are excluded. This protects the privacy of the client system 12, allowing the user to operate other programs in addition to the GUI application being monitored without the concern that anything other than graphical images from the GUI application is being captured. In an example embodiment, captured graphical data can be encrypted before transmission to the support server 10. In another example embodiment, a user can be given the ability to replay the captured graphical data from the GUI application and discard data that is deemed private before the captured data is sent to the support server 10.

A user can run the graphical image capture scheme on the client system 12 for a short duration, an extended period, or continuously. Running the scheme continuously provides a mechanism for capturing a bug when an unexpected bug occurs for the first time. A fixed amount of memory can be allocated to the scheme and a warning generated when the limit is close to being exceeded. Alternatively, as noted above, a circular buffer arrangement can be used and a warning message generated to flag that previously captured data is about to be overwritten.

The user can optionally discard some of the image captures, for example to delete sections that are unrelated to the user activity of interest. This can be useful before transmission to the support server 10. Further, a graphical image capture scheme can be configured to allow the user the option to pre-set "private data" areas of a display window of a GUI application (e.g., content of document, including words, conceptual designs, images, etc.) so as to prevent capture of such private information in the graphical images captured during an identified event for later analysis by support personnel at the support server 10.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Perl, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of capturing graphical objects presented by a computer system comprising:
   monitoring execution of an application on the computer system, wherein the monitoring comprises capturing and temporarily storing in a temporary storage buffer graphical objects associated with the application, wherein the graphical objects are captured as graphical images presented by the computer system, and at least one graphical image comprises a smaller portion of a graphical user interface display that is associated with the application;
   determining whether an event occurs during the monitoring, capturing and temporarily storing of objects that constitutes a triggering event;
   in response to a determination of a triggering event, permanently storing at least one captured graphical object to facilitate analysis of the at least one graphical object associated with the triggering event; and
   overwriting within the temporary storage buffer captured and temporarily stored graphical objects that have not been permanently stored;
   wherein:
      one or more graphical objects are captured automatically in accordance with a pre-defined set of rules for the application, and at least one captured graphical object was presented as a graphical image during execution of the application at a time prior to the triggering event; and
      the automatic capturing of each graphical object based upon the pre-defined set of rules includes:
         identifying each graphical object presented by the computer system and associated with the application; and
         based upon the identification of each graphical object, determining whether the identified graphical object will be captured.

2. The method of claim 1, wherein the determination based upon the identification of each graphical object includes a determination to not capture at least one identified graphical object that is presented by the computer system and associated with the application.

3. The method of claim 1, wherein:
   the permanently storing at least one captured graphical object in response to the triggering event comprises transferring the at least one captured graphical object from the temporary storage buffer to another storage location.

4. The method of claim 3, wherein the transfer of the at least one captured graphical object to another storage location comprises transferring the at least one captured graphical object to a second computer system for analysis.

5. A system for capturing graphical objects presented by a computer system comprising:
   a storage structure including a temporary storage buffer; and
   a processor configured with logic to:
   monitor execution of an application on the computer system, wherein the monitoring comprises capturing and temporarily storing in the temporary storage buffer graphical objects associated with the application, wherein the graphical objects are captured as graphical images presented by the computer system, and at least one graphical image comprises a smaller portion of a graphical user interface display that is associated with the application;
   determine whether an event occurs during the monitoring, capturing and temporarily storing of graphical objects that constitutes a triggering event;
   in response to a determination of a triggering event, permanently store at least one captured graphical object to facilitate analysis of the at least one graphical object associated with the triggering event; and
   overwrite within the temporary storage buffer captured and temporarily stored graphical objects that have not been permanently stored;
   wherein:
      one or more graphical objects are captured automatically in accordance with a pre-defined set of rules for the application, and at least one captured graphical object was presented as a graphical image during execution of the application at a time prior to the triggering event; and
      the automatic capturing by the processor of each graphical object based upon the pre-defined set of rules includes:
         identifying each graphical object presented by the computer system and associated with the application; and
         based upon the identification of each graphical object, determining whether the identified graphical object will be captured.

6. The system of claim 5, wherein the determination by the processor based upon the identification of each graphical object includes a determination to not capture at least one identified graphical object that is presented by the computer system and associated with the application.

7. The system of claim 5, wherein the processor is further configured with logic to:
   transfer the at least one captured graphical object from the temporary storage buffer to another storage location in response to the triggering event.

8. The system of claim 7, wherein the transfer of the at least one captured graphical object by the processor to another storage location comprises transferring the at least one captured graphical object to a second computer system for analysis.

9. A computer program product for capturing graphical objects presented by a computer system comprising:

a non-transitory computer readable storage medium having computer readable program code embodied therewith, the computer readable program code configured to:

monitor execution of an application on the computer system, wherein the monitoring comprises capturing and temporarily storing within a temporary storage buffer graphical objects associated with the application, wherein the graphical objects are captured as graphical images presented by the computer system, and at least one graphical image comprises a smaller portion of a graphical user interface display that is associated with the application;

determine whether an event occurs during the monitoring, capturing and temporarily storing of graphical objects that constitutes a triggering event in response to a determination of a triggering event, permanently store at least one captured graphical object to facilitate analysis of the at least one graphical object associated with the triggering event; and overwrite within the temporary storage buffer captured and temporarily stored graphical objects that have not been permanently stored;

wherein:
one or more graphical objects are captured automatically in accordance with a pre-defined set of rules for the application, and at least one captured graphical object was presented as a graphical image during execution of the application at a time prior to the triggering event; and the automatic capturing of each graphical object by the computer readable program code based upon the pre-defined set of rules includes:
identifying each graphical object presented by the computer system and associated with the application; and based upon the identification of each graphical object, determining whether the identified graphical object will be captured.

10. The computer program product of claim 9, wherein the determination by the computer readable program code based upon the identification of each graphical object includes a determination to not capture at least one identified graphical object that is presented by the computer system and associated with the application.

11. The computer program product of claim 9, wherein the computer readable program code is further configured to:
transfer the at least one captured graphical object from the temporary storage buffer to another storage location in response to the triggering event.

12. The computer program product of claim 11, wherein the transfer of the at least one captured graphical object by the computer readable program code to another storage location comprises transferring the at least one captured graphical object to a second computer system for analysis.

* * * * *